April 18, 1961 C. W. HURLEY ET AL 2,980,107
RECORDING SPHYGMOMANOMETER
Filed Jan. 16, 1958 6 Sheets-Sheet 5

INVENTORS
Charles W. Hurley
William P. Howell
BY Peck & Peck
ATTORNEYS

United States Patent Office 2,980,107
Patented Apr. 18, 1961

2,980,107

RECORDING SPHYGMOMANOMETER

Charles Warren Hurley, Chardon, Ohio (Quince Orchard Road, Rte. 3, Gaithersburg, Md.), and William L. Howell, 3562 Macomb St., Washington, D.C.

Filed Jan. 16, 1958, Ser. No. 709,238

19 Claims. (Cl. 128—2.05)

This invention relates broadly to apparatus for measuring and recording arterial blood pressure and in its more specific aspects it relates to such apparatus which is fully automatic in operation and eliminates human error in testing blood pressure and provides a permanent record of the pressures; and the nature and objects of the invention will be readily recognized and understood by those skilled in the arts to which it relates in the light of the following explanation and detailed description of the accompanying drawings illustrating what we at present believe to be preferred embodiments or mechanical expressions of our invention from among various other forms, arrangements, combinations, and constructions, of which the invention is capable within the spirit and scope thereof.

It is current practice to measure blood pressure, particularly in humans, by a sphygmomanometer which generally comprises a compression bag which is wrapped around a limb and is prevented from radial expansion under pressure, by the limb and by an unyielding cuff which is wrapped about the compression bag. The apparatus also includes a source of pressured air for inflating the compression bag, a manometer by which the applied pressure is read and a variable, controllable exhaust by means of which the system may be deflated at any desired rate.

The pressure in a sphygmomanometer system is raised to approximately 250 mm. of mercury. Since this pressure is greater than the pressure in the artery, the artery under the cuff is closed. The exhausting means for the system is then opened and the systolic pressure is then determined by observing the height of the mercury column or the reading of the aneroid manometer when the pressure in the cuff allows the blood to begin spurting through the artery. Since the pressure in the artery above the cuff is pulsating, the artery will remain closed except during the periods of the pulse cycle when the pressure in the artery exceeds the pressure in the cuff; hence blood will continue to pass through the artery under the cuff in spurts until the cuff pressure falls below the diastolic pressure in the artery.

The spurts of blood passing under the cuff may be observed by the operator by feeling the pulse of the patient or by listening through a stethoscope receiver applied snugly over the artery just below the cuff. The diastolic pressure can be determined only by listening for the spurts to cease. Blood pressure is recorded by noting the systolic and diastolic pressure, i.e. 150/90.

While the system for determining blood pressure which we have briefly outlined above has many advantages, there are certain disadvantages and inaccuracies in results which are inherent therein. For example, probably the most serious disadvantage of the sphygmomanometer as it is now known and used lies in the fact that sounds must be interpreted by the operator and correlated with visible means in order to determine the blood pressure. This injects the human element into the measuring process presenting a wide area for error. It is also a known fact that errors often occur through misuse of the apparatus or the technique which should be practiced in the operation of measuring the arterial blood pressure. A further disadvantage which is inherent in the sphygmomanometer is the inability to make allowances for the plasticity of the cuff, of the flesh around the artery and of the artery walls.

It has been one of our major purposes to devise an apparatus for measuring blood pressure in which the possibility of human error is fully eliminated. In accomplishing this prime purpose we have devised an apparatus which is fully automatic and does not require any interpretation by the operator of sounds nor must he correlate such sounds with any visible means.

In eliminating the possibility of human error which is present in prior art blood pressure measuring systems we have also devised an apparatus which requires no skill in its operation and as a matter of fact is capable of being operated by the patient. Hence, the apparatus of this invention is fully automatic in those phases of the measuring operation which formerly required skill, technical training and experience.

The apparatus of this invention involves mechanical means the operation of which is controlled by the air exhausting from the system, the exhausting air being affected by each spurt of blood through the artery under the cuff so that such mechanical means is sensitive to blood spurts through the artery. We also incorporate an electrical system in the apparatus which picks up a signal resulting from operation of the mechanical means and on the pick up causes actuation of mechanism producing a permanent record of the pressure measurement.

One of the many advantages of our organization and arrangement which will become apparent hereinafter is that the aforesaid signal is picked up without using power generated by the pulse of the patient.

In an apparatus of the character with which we are concerned it is desirable that the rate of deflation of the compression bag by exhausing the system of air remain constant. We have provided an exhaust valve which is combined in and associated with the mechanical means of the apparatus in such a manner that the air will be exhausted at a constant rate during operation of the system.

There is a need for a system whereby an operator at a single station will have selective access to a plurality of remote blood pressure measuring apparatus and indicators. We have devised such a system which will fill a long felt need in hospitals and the like where a plurality of blood pressures are being measured.

The system which we have devised is relatively economical to produce, is simple to operate and is compact and rugged and capable of clearly recording visible marks indicating the systolic and diastolic pressures in the artery.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

Fig. 6 is a view of a recording removed from the drum.

Fig. 7 illustrates the electric circuit controlled by the mechanical means and controlling the recording mechanism.

Figure 1:
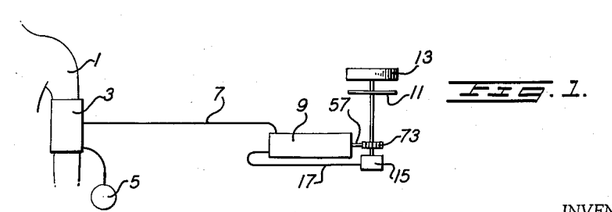
Fig. 1 is a diagrammatic view of the sphygmomanometer apparatus.

In the accompanying drawings, and particularly in Fig. 1 thereof, we have diagrammatically illustrated our sphygmomanometer organization and we have there illustrated the arm 1 of a patient whose blood pressure is being measured. We have used the numeral 3 to designate the conventional compression bag which is wrapped about the arm and is embraced by the unyielding cuff, the bag being in communication with a pressure generating means which may be a bulb 5. An exhaust line 7 in communication with the compression bag extends therefrom to mechanical means 9 which is controlled by the exhausting air to actuate means 11, such as a commutator, controlling the operation of an electrical system causing a recording to be made on a tape applied to drum 13. A valve means 15 is combined in the system by means of air line 17 which maintains a constant rate of flow of air exhausting from the mechanical means 9.

Figure 2:
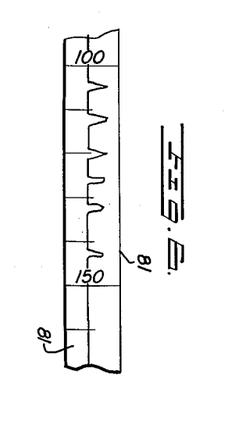
Fig. 2 is a view in section illustrating the mechanical means which is controlled by the exhausting air from the system and controls the operation of the electrical network actuating the recording mechanism.
Figure 3:
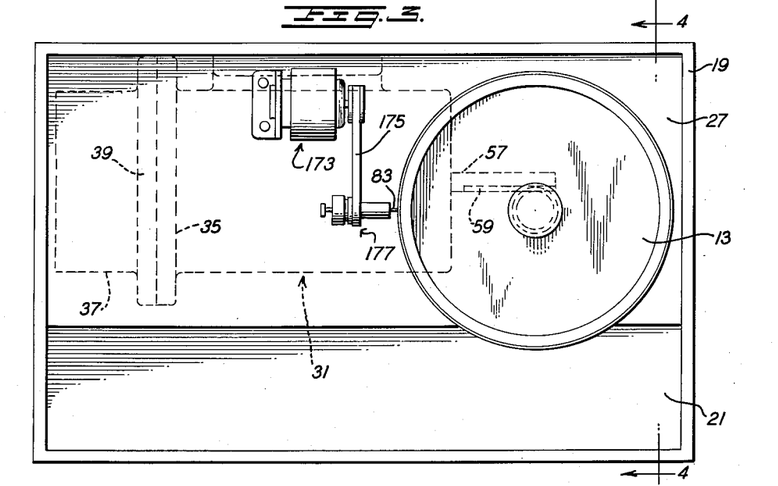
Fig. 3 is a top plan view of the mechanical means illustrated in Fig. 2.
Figure 4:
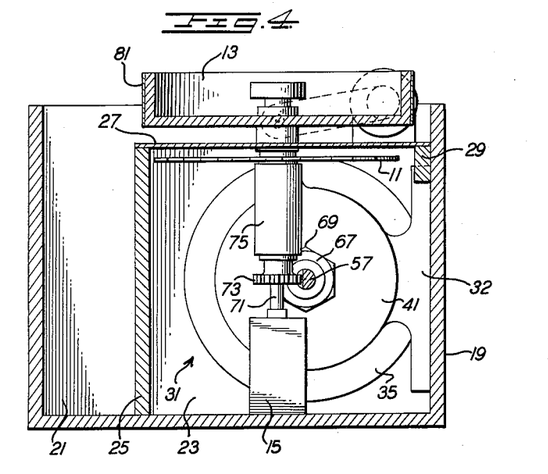
Fig. 4 is a view taken on line 4—4 of Fig. 3.

Referring to Figs. 2, 3 and 4 we have used the numeral 19 to designate a generally rectangular case for operatively housing and supporting those components of the apparatus which are not directly associated with the patient whose blood pressure is being measured. The casing is preferably divided into two compartments, 21 and 23, by means of a partition 25. A supporting platform 27 is provided which extends over compartment 23 and is supported by partition 25 and by blocks 29 which may be fixed in appropriate supporting positions on the casing walls. The compartment 23 has been particularly designed for housing certain operating parts of the apparatus while compartment 21 may well be used for housing the cuff organization 3, bulb 5 and air line 7 when the apparatus is not in use.

A cylinder designated in its entirety by numeral 31 is mounted, as by a bracket 32, within compartment 23 of the case 19. The cylinder is preferably of two part construction comprising a main body portion 33 having a radial annular flange 35 at its rear end, and a cap 37 having formed about its forward end a radial annular flange 39. The cap is adapted to be fastened to and close the rear end of the body portion of the cylinder by means of bolts or the like (not shown) which extend through the abutting flanges 35 and 39. The main body portion 33 of the cylinder is closed by a front wall 41 having a central opening formed therethrough.

A cup-shaped diaphragm 45 having a rim or flange 47 is mounted in the rear end of the cylinder by clamping the rim thereof between flanges 35 and 39 of the cylinder components. The diaphragm is formed of any suitable flexible material, is imperforate and is adapted to be moved forward from the position shown in Fig. 2 under the influence of the pressured air as will be explained, hereinafter.

A cylindrical piston element 49 of less diameter than that of cylinder 31 is provided for reciprocation within the cylinder under actuation by the diaphragm. The piston element is open at its forward end, is formed with a closed rear end 51 having a centrally positioned interior boss 53 provided with a central socket 55 therein and is received in the diaphragm as clearly disclosed in Fig. 2 of the drawings. We mount a piston rod 57 in socket 55, the piston rod being of a length sufficient to extend forwardly from its mounted position and through aperture 43 in the forward wall 41 of the cylinder 31. At its forward end portion the piston rod is formed with rack teeth 59 for a purpose which will become apparent as this description proceeds. A compression spring 61 is fixed at one end about the boss 53 and extends forwardly therefrom and about piston rod 57 and is adjustably fixed in the threads 63 of a circular anchoring member 65 having an externally threaded neck 67 extending forwardly therefrom and through aperture 43 in the front wall. The anchoring member's longitudinal position within the cylinder 31 is adjustably maintained by means of a clamp nut 69 threaded on that portion of the neck which extends exteriorly of the cylinder. The anchoring member 65 and its neck 67 are formed with a central opening therethrough through which the rod 57 and its rack bar section slidably extend.

It is to be appreciated that the length and the spring constant may be varied by adjusting the position of the nut 69 on the neck 67 of the spring anchoring member. Thus the spring, by the disclosed arrangement, may be calibrated by varying the number of active coils therein merely by changing the anchoring position of the spring in the threads 63.

The valve 15 rotatably mounts a shaft 71 in a manner to be hereinafter described. The shaft 71 projects upwardly from the valve and a pinion 73 is fixed to the shaft in mesh with the rack 59 on the piston rod 57, thus, when the piston rod is reciprocated the pinion and the shaft will be caused to rotate. The shaft is journalled in a journal bracket 75 which may be formed integral with cylinder 31 or, of course, the bracket may be otherwise supported. Upwardly spaced from the journal bracket we fix a commutator disc 11 on the shaft 71 for rotation therewith. The commutator disc is provided with conventional conductive segments and nonconductive segments for intermittently cooperating with a brush for picking up a signal for impressing on a network as will be explained. The shaft 71 extends upwardly and through platform 27 and may have a threaded end portion 77 receiving a clamp nut 79. A recording drum 13 is fixed in any suitable manner to that portion of shaft 71 which extends above the platform, and will of course rotate with the shaft 71. A tape 81 of any suitable type having scale markings thereon, is removably received about the periphery of the drum and is adapted to receive the markings from a stylus 83 which is actuated by our apparatus to record on the tape the recording of the systolic and diastolic pressures. It will now be recognized that reciprocation of the piston rod 57 will produce rotary motion in shaft 71 and that commutator 11 and drum 13 will rotate with the shaft.

Reciprocation of the rod causing rotation of the shaft and the members affixed thereto is produced in the following manner:

The base 85 of the cap 37 is of substantial thickness and is formed with an air duct 87 extending diametrically therethrough providing an inlet end adapted to receive the nipple 89 of air line 7 which extends to compression bag 3. The air duct 87 is in communication with the interior of cylinder 31 at the rear side of diaphragm by means of inlet orifice 93 which extends through the forward wall of duct 87.

Figure 5:
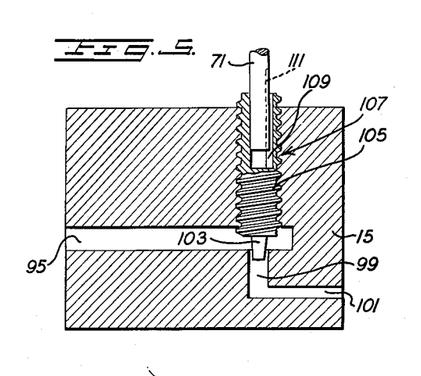
Fig. 5 is a view in section through the exhausting valve.

The valve 15 which is illustrated in detail in Fig. 5 is of block-like construction and is provided with an inlet duct 95 with which air line 17 is in communication by means of nipple 97. We provide an angled exhaust duct in the valve, such exhaust duct consisting of a leg 99 extending perpendicularly with respect to duct 95 and in communication therewith, and an end leg 101 in communication with said leg 99 and with the atmosphere. The rate of flow of air from inlet duct 95 to exhaust ducts 99 and 101 is controlled by a needle valve 103 having an exteriorly threaded stem 105 threadedly mounted in a hole 107 formed through the valve and opening into duct 95 above the point of juncture of ducts 95 and 99. The stem 105 is of tubular form and is provided with an inwardly extending rib 109 which is slidably received in a slot 111 which is formed in the lower part of shaft 71 which extends into stem 105. We have thus provided a splined connection between the shaft and the valve stem, hence when the shaft is rotated the valve will either be screwed inwardly or outwardly to either reduce flow of air through the valve block or increase the flow and relative axial movement between the valve stem and the shaft is permitted.

In the operation of our apparatus a conventional compression bag is wrapped about the arm of the patient and the unyielding cuff is wrapped around the bag to provide the organization 3 of Fig. 1. The exhaust line 7 is connected into the inlet end of duct 87 as at 89 and the air control line 17 is in communication with the outlet of duct 87 as at 91 and with the inlet of valve 15. A length of recording tape 81 is affixed to drum 13 in such position that at the start of the measuring operation the highest scale point marked on the tape will be adjacent the recording stylus 83. As the drum is rotated, as will be explained, the lower readings will pass the stylus and the systolic and diastolic markings will be marked on the tape at the accurate positions thereon. The operator of the apparatus inflates the compression bag by means of bulb 5, or by any other suitable means, until the bag pressure is sufficient to overcome the arterial pressure thereby halting the flow of blood through the artery past organization 3. At the initiation of the measuring operation the needle valve is set to its lowermost position in the valve orifice to substantially restrict the flow of exhausting air through the valve.

With the components in the described conditions and the system inflated pressured air will have projected diaphragm 45 forwardly which in turn will project piston 49 and piston rod 57 forwardly. In this condition of the apparatus air will be exhausting from the compression bag through line 7, duct 87, orifice 93, line 17 and through valve 15. During this exhausting period the piston rod 57 and its associated elements will be retracting thereby causing shaft 71 to rotate and this rotation of the shaft will of course result in rotary motion in both the commutator 11 and the drum 13. When the compression bag is deflated sufficiently a spurt of blood will pass through the artery causing a momentary pause in the retraction of the diaphragm, piston, piston rod and in the rotation of the shaft, the commutator and the drum. Thus, as the system is gradually deflated the blood spurts will continue as will the momentary pauses in retraction and rotation of the various elements as explained above. When the pressure in the artery fully overcomes that in the compression bag the diastolic pressure will have been reached.

It is to be understood that when the piston and rod are fully projected the needle valve 103 will be in its maximum air flow restricting position and as the piston and piston rod are retracted as the system is deflated the shaft 71 will unscrew the valve stem 105 thereby raising needle valve 103 permitting a gradual increase in the rate of flow of the air exhausting from the system.

As will become apparent hereinafter the rate of deflation must be constant (or nearly constant) to make the basic principle used in electrically amplifying the signal from a spurt of blood passing under the cuff function satisfactorily. Since the air pressure in the cylinder 31 is never above the critical limit, the rate of flow of the air through discharge orifice 101 will be proportional to the pressure in the cylinder. To obtain a constant rate of discharge of the air in the system, the area of the orifice is varied as the pressure in the cylinder drops. The area of the orifice is varied by raising and lowering the tapered needle valve 103 into the orifice of a fixed diameter.

The needle valve 103 is so shaped and operatively mounted that the air is allowed to exhaust at such a rate that the speed of rotation of the commutator is constant as long as the system is not disturbed by any external source.

It is to be understood that we do not intend to be limited to the specific type of valve illustrated for various other mechanical means under control of the commutator shaft for operating the valve may be used and will fall within the spirit and scope of our invention.

As we have stated above the mechanical means which we have described and which is controlled by the air exhausting from the compression bag actuates the commutator shaft 71 and the commutator 11 which functions as a distributor which impresses a signal on an electrical system, about to be described, which causes the actuation of the recording stylus 83 to make a recording on the tape.

In Fig. 7 we have disclosed one form of electric means which may be satisfactorily used to produce the recording on the tape on the drum. In this electrical system we have used the numerals 113 and 115 to designate leads which may be connected to a source of electric power which may be 110 volts A.C. and we provide a switch SW1 to control the energizing of the network about to be described.

A conductor 117 extends from one side of switch SW1 to a cold cathode glow discharge tube 119 and a conductor 121 connects the other side of switch SW1 with a further conductor 123 which is connected to one side of the winding of relay 125, the other side of the winding being connected to tube 119 by a lead 127. Connected across relay 125 by means of leads 129 and 131 are a capacitor $C_3$ and a resistor $R_4$. A conductor 133 is connected as at 135 to conductor 123 and to lead 137 at terminal 139, a diode $D_1$ being connected in conductor 133 as is a resistor $R_3$. The lead 137 is connected to one contact 141 of a relay 143 while the other relay contact 145 is connected to a resistor $R_2$ which is connected to conductor 117 at terminal 147. A capacitor $C_2$ is connected across lead 137 and conductor 117 by means of conductors 149 and 151, while a resistor $R_1$ and capacitor $C_1$ are connected across conductors 133 and 117 by means of conductors 153, 155 and 157. The commutator 11 is connected to one end of the winding of relay 143 and a brush 159 engages the commutator and is connected as at 161 to conductor 155 between resistor $R_1$ and capacitor $C_1$. The other end of winding of relay 143 is connected to conductor 117 at terminal 163. A resistance $R_5$ is connected to the tube 119 and into the circuit at terminal 139. Leads 165 and 167 are connected to contacts 169 and 171 of relay 125 and these leads are connected to stylus actuator designated generally by numeral 173 which is mounted on platform 27 in position adjacent the drum 13. The stylus actuator may be of any suitable type and as one example thereof we have illustrated a rotary solenoid which when energized swings arm 175 upwardly, the arm carrying any suitable mounting means 177 for holding the stylus 83.

The circuitry just described operates in the following manner to perform the function of recording the blood pressures on the recording tape. When the system is fully inflated and the piston and piston rod are projected the switch SW1 is closed to provide current for the circuit. When the switch is closed capacitors $C_1$ and $C_2$ begin to charge through resistors $R_1$ and $R_3$, respectively, because of the diode, $D_1$, in the circuit. As pointed out above following full inflation of the system deflation thereof will commence and the gradual retraction of the piston will occur resulting in rotation of the commutator. As the commutator 11 revolves relay 143 will be energized closing contacts 141 and 145 and thereby discharging capacitor $C_1$ through the winding of relay 143 and also discharges capacitor $C_2$ through the contacts 141 and 145 of the relay and through resistor $R_2$. The ratio of the resistor $R_1$ to resistance of coil or winding of relay 143 is such that contacts 141 and 145 remain closed for only a few milliseconds regardless of the time the brush 159 remains on a conducting segment of the commutator. The time constant of the $R_1$—$C_1$ circuit is such that the capacitor becomes fully charged while the brush 159 is in engagement with a non-conducting segment of the commutator. This action assures a complete energized cycle of relay 143 each time the brush comes in contact with a conducting segment of the commutator.

The time constant of the $R_3$—$C_2$ circuit is such that the capacitor $C_2$ is never charged to the firing voltage of tube 119 when the commutator is revolving at its normal speed. However, when a spurt of blood passes through the artery under the cuff organization 3 a pause occurs in the rate of deflation of the system, the retraction of the piston and piston rod momentarily stops and consequently there is a hesitation or pause in the rotation of the commutator. The brush therefor remains on a conducting or non-conducting segment long enough to allow the capacitor $C_2$ to reach the firing voltage of the tube and the tube begins to conduct and the contacts 169 and 171 of relay 125 are closed and solenoid 173 energized to swing the stylus 83 upwardly to produce a recording on the tape on the periphery of the drum, as illustrated in Fig. 6 wherein we have disclosed a typical blood pressure recording taken from a patient with systolic pressure of 145 and a diastolic pressure of 105. The stylus will make a continuous straight-line recording until the pressure of the blood exceeds the pressure of the compression in the cuff. At this point a surge through the artery will cause a hesitation in the mechanical movement of the apparatus whereupon the capacitor $C_2$ will be given sufficient time to charge to the firing voltage of the tube 119 which will energize the relay, operate the solenoid, and operate the stylus to record the pulse. The stylus will then continue to make a straight-line as the cuff deflates until the second surge of blood passes under the cuff causing a second pause and the same operation as described. This operation will continue for each pulse that passes under the cuff, making a recording for each pulse until the pressure in the cuff falls below the diastolic pressure in the artery. At this point there will be no further surges causing hesitation and readings on the tape.

It will be understood that the size of the brush is such relative to the conducting and non-conducting segments of the commutator that when there is a pause in the rotation of the commutator, the brush will contact either a conducting or a non-conducting segment and will not be in contact with both.

The resistor $R_5$ limits the starter current in the glow tube. The resistor $R_2$ simply protects the contacts of relay 143. The resistor $R_4$ and capacitor $C_3$ damp oscillations of the relay 125 while the tube is conducting.

When the commutator starts turning again, the capacitor $C_2$ is discharged as before and the negative portion of the A.C. supply voltage cuts the tube off. The tube then remains in a non-conducting state until the capacitor $C_2$ is again allowed to charge to the firing voltage of the glow tube.

As the system deflates, the first pause will indicate the first spurt of blood passing under the cuff and therefore represent the systolic pressure. The rate of deflation will continue to pause with each spurt of blood passing under the cuff until the pressure in the cuff falls below the diastolic pressure in the arterial system under the cuff. At this point, the flow of blood in the artery will no longer affect the system of the recording sphygmomanometer because the pressure in the cuff will be less than the diastolic or static pressure in the artery. Therefore, the first mark on the record will be at the systolic pressure. The marks representing the pulses between the systolic and diastolic pressure will indicate any prominent irregularities in the pulse rate.

Figure 8:
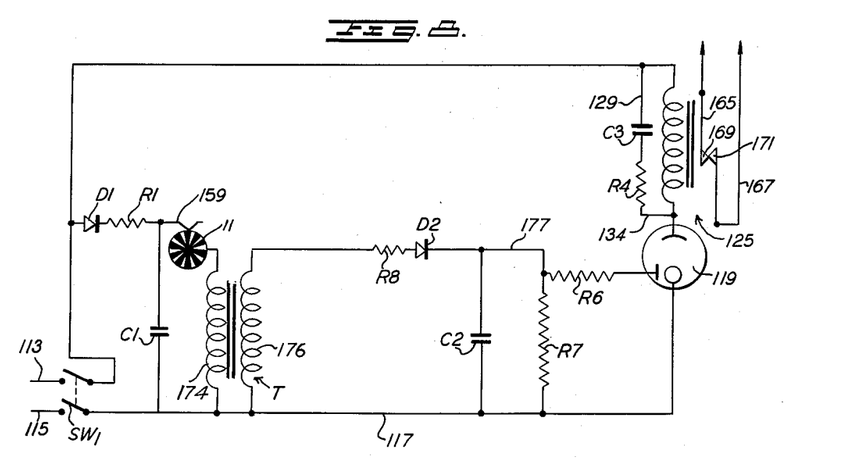
Fig. 8 illustrates a further electric circuit which may be used in place of the circuit of Fig. 7.

In Fig. 8 of the drawings we have illustrated a further electrical network which may be used with our apparatus. In this form of our invention we have used the same reference designations as used in connection with Fig. 7 for similar parts.

In this circuit we have provided a transformer T, the primary winding 174 of which is connected to the commutator 11 and to conductor 117 while the secondary winding 176 is connected to conductor 117 and to a resistor $R_8$ which in turn is connected to a diode $D_2$. A conductor 177 leads from diode $D_2$ to resistor $R_7$ which in turn is connected to conductor 117. A resistor $R_6$ is connected to tube 119 and to conductor 177 and the capacitor $C_2$ is connected across conductors 117 and 177.

This circuit operates in the following manner:

Capacitor $C_1$ is discharged by the commutator through the primary winding 174 of the transformer T which causes a positive and negative pulse in the secondary winding 176. The negative pulses are blocked by the diode $D_2$ and the positive pulses tend to charge $C_2$. The time constant of $C_2 R_7$ is such that the capacitor $C_2$ remains above the firing voltage of the tube 119 as long as the commutator pulses the transformer at a normal rate. When the commutator pauses from a change in the rate of deflation caused by a spurt of blood passing under the cuff, the capacitor $C_2$ discharges through $R_7$ to a voltage below the firing voltage of the tube and the conduction in the tube is cut off on the negative portion of the next A.C. power supply voltage. The relay is opened and a signal is obtained.

Figure 9:
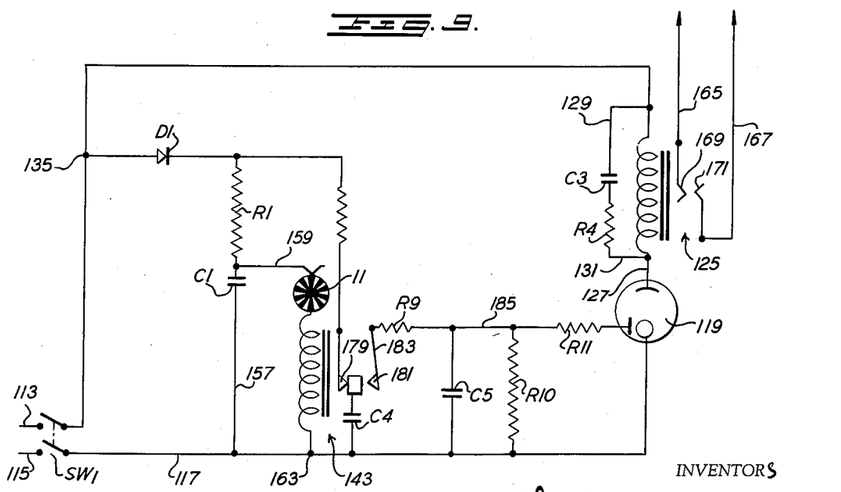
Fig. 9 illustrates another electric circuit which may be used in place of those illustrated in Figs. 7 and 8.

Fig. 9 discloses a further electrical system which may be used in our sphygmomanometer apparatus. In this circuit the same reference numerals have been used for the same electrical components as were used in connection with the network of Fig. 7.

This circuit includes a relay 143 one contact 181 of which is connected by conductor 183 with resistance $R_9$ which, through conductor 185 is connected to tube 119, a resistance $R_{11}$ being connected in conductor 185 between resistance $R_9$ and the tube. A capacitor $C_5$ is connected across conductors 185 and 117 as is a resistance $R_{10}$.

In operation relay 143 is energized in the same manner as is relay 143 in Fig. 7. When this energization occurs capacitor $C_4$ discharges through the relatively small resistance $R_9$ into capacitor $C_5$. This capacitor $C_5$ is constantly discharging through resistance $R_{10}$ at such a rate capacitor $C_5$ remains above the firing voltage of tube 119 as long as the commutator is energizing the relay 143 at the normal rate. When a spurt of blood passes through the artery under cuff organization 3 thereby causing a pause in the rotation of commutator 11, capacitor $C_5$ discharges to a voltage below the firing voltage of the tube and the tube is cut off in the same manner as described in connection with the circuit of Fig. 8.

Figure 10:
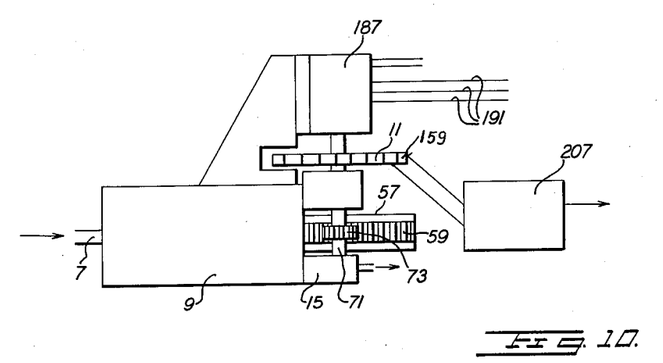
Fig. 10 is a schematic view of an organization of components whereby blood pressure indications may be given at a station remote from the patient.
Figure 11:
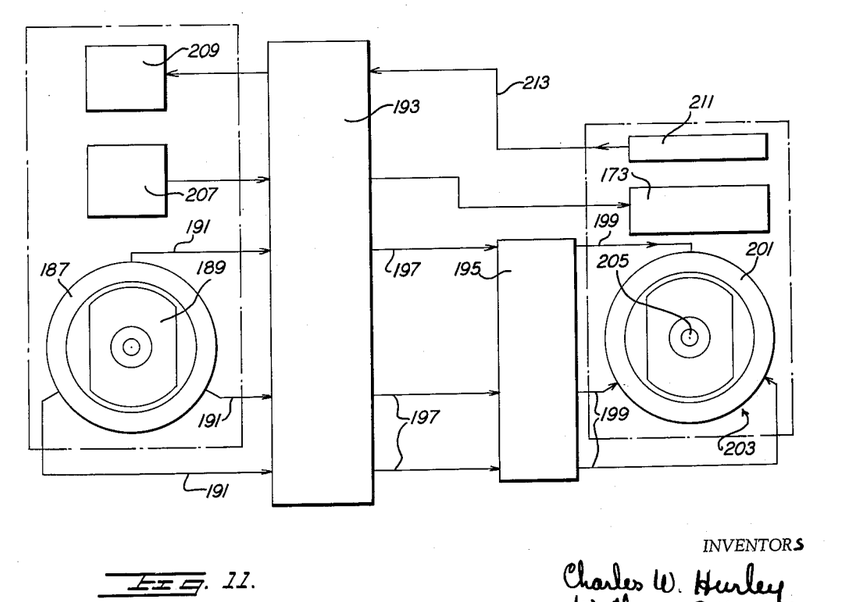
Fig. 11 is a diagrammatic view of the connections between the sphygmomanometer unit and the central recording unit which may be remotely positioned with respect thereto.
Figure 12:
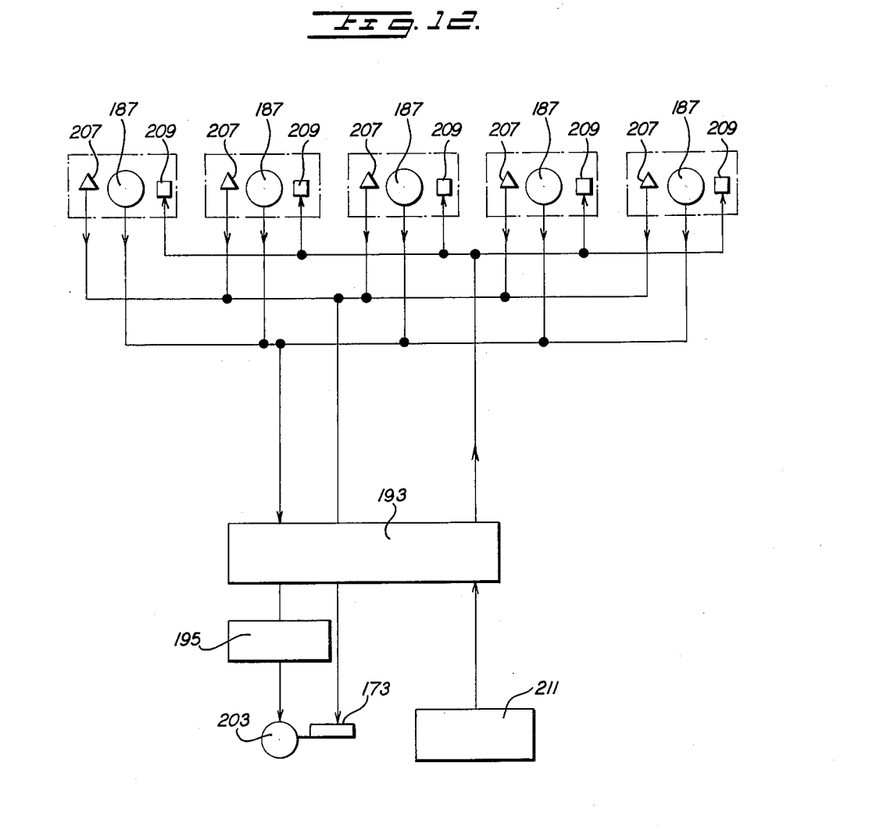
Fig. 12 is a diagrammatic showing of a multi-unit system wherein the central recording and controlling station is remote from a plurality of patient stations and the operator of the central station may selectively take a measurement of any patient and secure a recording thereof at the central station.

In Figs. 10, 11 and 12 a novel system using the apparatus described above and the principles thereof is disclosed. We have devised this system especially for institutional use where it is highly desirable to have access to a plurality of blood pressure indicators at a single central station.

The same reference characters have been used in Figs. 10, 11 and 12 to describe parts which are the same as those described in Figs. 1 through 6.

In Fig. 10 the air line 7 is illustrated connected to and in communication with the air cylinder or mechanical means 9 from which the rack portion 59 of piston rod 57 reciprocably extends. The exhaust valve 15 is connected into the apparatus as described. The meshing rack and pinion drive the shaft 71 on which the commutator 11 is fixed. The recording drum 13 is omitted from the sphygmomanometer apparatus at each patient station and, as will be explained is used at the single central station. A selsyn 187 is mounted on shaft 71 for rotation therewith. It will be recognized that since the displacement of the piston 49 which controls reciprocation of piston rod 57 is proportioned to the air pressure in the cylinder 9, the angular displacement of the selsyn rotor 189 (Fig. 11) will also be proportioned to the cylinder pressure.

The leads 191 from the stator of the selsyn 187 are connected through any suitable selector switch 193 and an amplifier 195 by leads 197 to the leads 199 of the stator 201 of a second selsyn 203. The selsyn 203 is fixed on a shaft 205 for a reason to be hereafter explained, and is positioned at the central station.

The pulse detector 207, which is the electrical device of Figs. 7, 8 or 9, or of any equivalent device is, of course, connected to the commutator 11 and also to the selector switch 193, and to the stylus actuator 173 at the central recording station.

At each patient station where the apparatus of Fig. 10 is located we may also provide means for automatic inflation of the system. It is preferable to accomplish this by providing an ordinary tank of compressed air at each patient station the outlet of which is controlled by any suitable solenoid operated valve 209 which is connected to a start switch 211 at the central station by means of leads 213 connected through the selector switch.

It will now be appreciated that at each of a plurality of patient stations the apparatus of Fig. 10 will be located as well as the compressed air tank and solenoid valve 209, and at the central station the selector switch 193, the selsyn 203, and the stylus actuator 173. The drum 13 is fixed on shaft 205 and will rotate therewith.

An operator at the central station can select any one of the plurality of stations by operating the selector switch and then pushing the start switch 211 whereupon the solenoid valve 209 will open the compressed air tank and the selected sphygmomanometer will be inflated. Rotor 189 will be rotated by shaft 71 and shaft 205 will be correspondingly rotated to cause rotation of the recording drum and pulse detector 207 will cause actuation of the stylus to produce a recording at the central station.

The amplifier 195 is used only to reduce the torque required to rotate the selsyn mounted on the air cylinder.

It will now be recognized that we have evolved a simple and practical system whereby an operator at a central recording station may selectively secure a recording from one of a number remotely positioned sphygmomanometer units.

We claim:

1. A recording sphygmomanometer, including in combination, a compression means and cuff adapted to embrace a limb of the patient, means for inflating said compression means to a pressure preventing flow of blood through the artery in the limb, a system for exhausting air from said compression means to permit passage of blood through said artery in spurts, said system including means for causing the exhaust of air therefrom at a constant rate, mechanism interposed in said system the normal operation of which is sensitive to and is changed by pressure changes in the system caused by spurts of blood through the artery, said mechanism including a recording drum; and an electric network, a source of electric power therefor, a stylus for inscribing on said recording drum and stylus actuating means connected in said electric network, said mechanism including a rotary electrical distributor member connected in said mechanism and having conductive and non-conductive surfaces, a brush connected in said network and engageable with said conductive and non-conductive surfaces, said electric network including two electric circuits each including a resistance and a capacitor, a relay for operating said stylus actuating means, an element operable at a predetermined voltage for operating said relay and a second relay connected to said circuits, the time constant of one of said circuits being such that the capacitor thereof becomes fully charged to close said second relay when the brush is on a non-conductive segment of said member while the time constant of said second circuit is such that the capacitor is discharging when the mechanism is operating normally.

2. A recording spygmomanometer, including in combination, a compression means and cuff adapted to embrace a limb of the patient, means for inflating said compression means to a pressure preventing flow of blood through the artery in the limb, a system for exhausting air from said compression means to permit passage of blood through said artery in spurts, said system including means for causing the exhaust of air therefrom at a constant rate, mechanism interposed in said system and caused to operate normally by the exhausting air and to pause under the influence of pressure changes in the system caused by spurts of blood through the artery, said mechanism including a recording drum; and an electric circuit, a source of electric power therefor, a stylus for inscribing on said recording drum and stylus actuating means connected in said electric circuit, an electric distributor member operatively connected to said mechanism and caused to rotate by the operation thereof and to pause when said mechanism pauses, said member being provided with electrical conductive and non-conductive surfaces, a brush in said circuit engageable with the conductive and non-conductive surfaces of said member and means in said electric circuit operable to cause operation of the stylus actuating means when said member pauses in its operation.

3. A recording sphygmomanometer, including in combination, a compression means and cuff adapted to embrace a limb of the patient, means for inflating said compression means to a pressure preventing flow of blood through the artery in the limb, a system for exhausting air from said compression means to permit passage of blood through said artery in spurts, said system including means for causing the exhaust of air therefrom at a constant rate, projectible and retractable mechanism mounted in said system the rate of movement thereof being controlled by said exhausting air and pressure changes therein caused by spurts of blood through the artery, a recording drum and an electrical distributor member operatively connected with said mechanism and caused to rotate at a rate comparable to the rate of movement of said mechanism, and an electric circuit, a source of electric power therefor, a stylus for inscribing on said recording drum and stylus actuating means connected in said electric circuit and said electrical distributor member being connected in said electric circuit, further means in said electric circuit sensitive to the changes in rate of rotation of said electrical distributor member and operable thereby to cause actuation of said stylus actuating means to cause operation of the stylus.

4. A recording sphygmomanometer, including in combination, a compression means and cuff adapted to embrace a limb of the patient, means for inflating said compression means to a pressure preventing flow of blood through the artery in the limb, a system for exhausting air from said compression means to permit passage of blood through said artery in spurts, said system including means for causing the exhaust of air therefrom at a constant rate, a cylinder in said system, a piston operably mounted in said cylinder, the movement thereof being controlled by the exhausting air and by pressure changes in the system caused by spurts of blood flowing through said artery, a recording drum and an electrical distributor member, means connecting said recording drum and electrical distributor to said piston to cause rotation thereof at a rate commensurate with the rate of movement of the piston, and an electric circuit, a source of electric power therefor, a stylus for inscribing on said recording drum and stylus actuating means connected in said electric circuit and said electrical distributor member being connected in said electric circuit, further means in said electric circuit sensitive to the changes in the rate of rotation of said electrical distributor member and operable thereby to cause actuation of said stylus actuating means to cause actuation of the stylus.

5. A recording sphygmomanometer, including in combination, a compression means and cuff adapted to embrace a limb of the patient, means for inflating said compression means to a pressure preventing flow of blood through the artery in the limb, a system for exhausting air from said compression means to permit passage of blood through said artery in spurts, said system including means for causing the exhaust of air therefrom at a constant rate, a pressure cylinder connected in said system, a piston operatively mounted in said cylinder, said piston being projected at full inflation of said compression means and the rate of retraction thereof being controlled by the exhausting air and pressure changes caused by spurts of blood passing through said artery, a recording drum and an electrical distributor member, means connecting said recording drum and electrical distributor member to said piston and causing rotation of the drum and member at a rate the same as the rate of retraction of the piston in the cylinder, and an electric circuit, a source of electric power therefor, a stylus for inscribing on said recording drum and stylus actuating means connected in said electric circuit and said electrical distributor member being connected in said electric circuit, further means in said electric circuit sensitive to the changes in the rate of rotation of said electrical distributor member and operable thereby to cause actuation of said stylus actuating means to cause actuation of the stylus.

6. A recording sphygmomanometer in accordance with claim 5, wherein said means connecting said recording drum and electrical distributor member to said piston comprises a piston rod fixed to said piston for movement therewith, a shaft connected to said piston rod and caused to rotate upon movement of said piston rod, said recording drum and electrical distributor member being fixed on said shaft for rotation therewith.

7. A recording sphygmomanometer in accordance with claim 5, wherein said means connecting said recording drum and electrical distributor member to said piston comprises a piston rod fixed to said piston for movement therewith, said piston rod having rack teeth on the outer end thereof, a shaft and a pinion fixed on said shaft in mesh with said rack teeth for causing rotation of the shaft when said piston rod is moved, said recording drum and electrical distributor member being fixed on said shaft for rotation therewith.

8. A recording sphygmomanometer, including in combination, a compression means and cuff adapted to embrace a limb of the patient, means for inflating said compression means to a pressure preventing flow of blood through the artery in the limb, a system for exhausting air from said compression means to permit passage of blood through said artery in spurts, said system including means for causing the exhaust of air therefrom at a constant rate, a cylinder connected in said system and a piston operably mounted in said cylinder, the movements of said piston being controlled by the exhausting air and the pressure changes in the system caused by spurts of blood passing through the artery, a recording drum and an electrical distributor member, means operatively connecting said drum and member to said piston causing rotation thereof when the piston moves and said means for causing the exhaust of air from the system at a constant rate being operatively connected to said last named means to maintain a constant rate of exhaust from the system, and an electric circuit, a source of electric power therefor, a stylus for inscribing on said recording drum and stylus actuating means connected in said electric circuit and said electrical distributor member being connected in said electric circuit, further means in said electric circuit sensitive to the changes in the rate of rotation of said electrical distributor member and operable thereby to cause actuation of said stylus actuating means to cause actuation of the stylus.

9. A recording sphygmomanometer in accordance with claim 8 wherein said means for causing the exhaust of air from the system at a constant rate is a needle valve.

10. A recording sphygmomanometer in accordance with claim 8 wherein said means operatively connecting said recording drum and said electrical distributor member to said piston comprises a piston rod fixed to the piston and movable therewith, a shaft engageable with said piston rod and rotatable thereby, said drum and member being fixed on said shaft for rotation therewith, and said shaft is operatively connected to said means for causing the exhaust of air from the system at a constant rate in order to adjust said last named means as the system deflates.

11. A recording sphygmomanometer in accordance with claim 8 wherein said means for causing the exhaust of air from the system at a constant rate is a valve and said means operatively connecting said recording drum and said electrical distributor member to said piston comprises a piston rod fixed to the piston and movable therewith, a shaft engagable with said piston rod and rotatable thereby, said drum and member being fixed on said shaft for rotation therewith, and said shaft is operatively connected to said valve to adjust the same enlarging the outlet as the air is exhausted from the system.

12. A recording sphygmomanometer, including in combination, a compression means and cuff adapted to embrace a limb of the patient, means for inflating said compression means to a pressure preventing flow of blood through the artery in the limb, a system for exhausting air from said compression means to permit passage of blood through said artery in spurts, said system including means for causing the exhaust of air therefrom at a constant rate, a pressure cylinder connected in said system, a piston operatively mounted in said cylinder, said piston being projected at full inflation of said compression means and adapted to retract as the air is exhausted from the system, a coil spring operable to bias said piston to retracted position, an anchoring head having exterior threads thereon and said spring being threaded at one end on said head, means adjusting the position of said head axially with respect to the spring to adjust the spring constant, the rate of retraction of said piston being controlled by the air exhausting from the system and by pressure changes in the system caused by spurts of blood passing through the artery, a recording drum and an electrical distributor member, means connecting said recording drum and electrical distributor member to said piston and causing rotation of the drum and member at a rate the same as the rate of retraction of the piston in the cylinder, and an electric circuit, a source of electric power therefor, a stylus for inscribing on said recording drum and stylus actuating means connected in said electric circuit and said electrical distributor member being connected in said electric circuit, further means in said electric circuit sensitive to the changes in the rate of rotation of said electrical distributor member and operable thereby to cause actuation of said stylus actuating means to cause actuation of the stylus.

13. A system for recording the blood pressure at a central station of a selected one of a plurality of patients remotely located with respect to the central station, including in combination, a sphygmomanometer apparatus for each patient, an electric circuit and a source of electric power therefor, each apparatus including a rotatable electrical distributor member connected in said circuit, the rate of rotation of which is controlled by the air exhausting from the apparatus and is caused to pause in its rotary movement by a spurt of blood passing through the compressed artery of the patient, an electric pulse detector electrically connected with said rotatable electrical distributor member, electrical means mechanically connected to said rotatable member for rotation therewith at the same rate of rotation; and a selector switch positioned at the central station, a recording apparatus positioned at the central station, said recording apparatus including a further electrical means electrically connected through said selector switch with any selected one of said first named electrical means and caused to rotate when said first named electrical means is rotated and at the same rate of speed, a recording drum connected to said further electrical means and rotated thereby, a stylus for inscribing on said recording drum, stylus actuating means electrically connected through said selector switch with any selected one of said pulse detectors for actuation thereby, whereby the operator at the central station may by actuation of said selector switch selectively connect the recording apparatus at the central station with any selected sphygmomanometer apparatus and secure a recording of the blood pressure of the patient to which said selected sphygmomanometer is connected.

14. A recording sphygmomanometer, including in combination, a compression means and cuff adapted to embrace a limb of the patient, means for inflating said compression means to a pressure preventing flow of blood through the artery in the limb, a system for exhausting air from said compression means to permit passage of blood through said artery in spurts, said system including means for causing the exhaust of air therefrom at a constant rate, mechanism interposed in said system the normal operation of which is sensitive to and is changed by pressure changes in the system caused by spurts of blood through the artery, said mechanism including a recording drum; and an electric circuit, a source of electric power therefor, a stylus for inscribing on said recording drum and stylus actuating means connected in said electric circuit, a rotary electrical distributor member operably connected to said mechanism and rotated thereby at a constant rate when said mechanism is operating normally, and being caused to pause in its rotation when the operation of said mechanism is changed by pressure changes in the system caused by spurts of blood through the artery, and said rotary electrical distributor member being connected in said electric circuit, and further means in said circuit and connected with said rotary electrical distributor, the operation of said further means being controlled by the rate of rotation of said rotary electrical distributor member, said further means being operable to cause operation of said stylus actuating means when said rotary electrical distributor member pauses in its rotation.

15. A recording sphygmomanometer in accordance with claim 14, wherein said further means includes, a relay for operating said stylus actuating means, an element operable at a predetermined voltage for energizing said relay, a capacitor connected to said element for impressing voltage thereon and means connected to and controlled by said rotary electrical distributor member for discharging said capacitor when said mechanism is operating normally and for charging said capacitor to the operating voltage of said element when the operation of said mechanism is effected by spurts of blood through the artery.

16. A recording sphygmomanometer in accordance with claim 14, wherein said further means includes, a relay for operating said stylus actuating means, an element operable at a predetermined voltage for energizing said relay, a capacitor connected to said element for impressing voltage thereon, and means connected to and controlled by said rotary electrical distributor member for discharging said capacitor when said mechanism is operating normally and for charging said capacitor to the operating voltage of said element when the operation of said mechanism is effected by spurts of blood through the artery, said last named means including a relay.

17. A recording sphygmomanometer in accordance with claim 14, wherein said rotary electric distributor member rotates at a constant speed when said mechanism is operating normally and is caused to pause when a spurt of blood passes through said artery and said further means includes, a relay for operating said stylus actuating means, an element operable at a predetermined voltage for energizing said relay, a capacitor connected to said element for impressing voltage thereon and means connected to and controlled by said rotary electrical distributor member for discharging said capacitor when said mechanism is operating normally and for charging said capacitor to the operating voltage of said element when said mechanism is caused to pause by a spurt of blood passing through the artery.

18. A recording sphygmomanometer in accordance with claim 14, wherein said rotary electric distributor member rotates at a constant speed when said mechanism is operating normally and is caused to pause when a spurt of blood passes through said artery and said member is formed with electrical conductive and non-conductive segments, and said further means includes, a relay for operating said stylus actuating means, an element operable at a predetermined voltage for energizing said relay, means connected to said element and chargeable to a voltage for operating said element, a second relay connected to said electric distributor member and to said last named means and operable to cause charging thereof when said second relay is deenergized and to cause discharging thereof when said second relay is energized, and additional means in said circuit causing said relay to be energized when said circuit is connected to a non-conductive segment of said rotary electrical distributor segment.

19. A recording sphygmomanometer in accordance with claim 14, wherein said rotary electric distributor member rotates at a constant speed when said mechanism is operating normally and is caused to pause when a spurt of blood passes through said artery and said member is formed with electrical conductive and non-conductive segments, the member being connected into the electric circuit by means of a brush engageable with the conductive and non-conductive surface thereof, and said further means includes, a relay for operating said stylus actuating means, an element operable at a predetermined voltage for energizing said relay, a capacitor connected to said element and chargeable to a voltage for operating said element, a second relay connected to said rotary electric distributor member and to said capacitor and operable to cause charging thereof when said second relay is deenergized and to cause discharging thereof when said second relay is energized, and a further capacitor in said circuit chargeable when said brush engages a non-conducting segment to energize said second relay.

References Cited in the file of this patent

UNITED STATES PATENTS

| | | |
|---|---|---|
| 1,532,705 | Levin | Apr. 7, 1925 |
| 2,375,059 | Williams et al. | May 1, 1945 |
| 2,660,164 | Hasbrouck | Nov. 24, 1953 |
| 2,710,001 | Freyburger | June 7, 1955 |